United States Patent
Oka et al.

(10) Patent No.: US 10,940,400 B2
(45) Date of Patent: Mar. 9, 2021

(54) HEAT TREATMENT FURNACE DEVICE AND METHOD FOR PRODUCING CARBON FIBER BUNDLE

(71) Applicant: Mitsubishi Chemical Corporation, Chiyoda-ku (JP)

(72) Inventors: Yusuke Oka, Tokyo (JP); Hiroshi Inagaki, Tokyo (JP); Nobuyuki Yamamoto, Tokyo (JP); Atsushi Kawamura, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 328 days.

(21) Appl. No.: 15/552,526

(22) PCT Filed: Feb. 24, 2016

(86) PCT No.: PCT/JP2016/055447
§ 371 (c)(1),
(2) Date: Aug. 22, 2017

(87) PCT Pub. No.: WO2016/136814
PCT Pub. Date: Sep. 1, 2016

(65) Prior Publication Data
US 2018/0339242 A1 Nov. 29, 2018

(30) Foreign Application Priority Data
Feb. 25, 2015 (JP) .............................. JP2015-035036

(51) Int. Cl.
*B01D 5/00* (2006.01)
*D01F 9/22* (2006.01)
(Continued)

(52) U.S. Cl.
CPC ............... *B01D 5/009* (2013.01); *B01D 5/00* (2013.01); *B01D 5/0012* (2013.01); *B01D 8/00* (2013.01);
(Continued)

(58) Field of Classification Search
CPC .. D01F 9/22; B01D 5/009; B01D 5/00; B01D 8/00; F28B 1/06
See application file for complete search history.

(56) References Cited

FOREIGN PATENT DOCUMENTS

| JP | 53-102276 A | 9/1978 |
| JP | 59-116419 A | 7/1984 |

(Continued)

OTHER PUBLICATIONS

A different machine translation of Oka JP2012201997 (Year: 2012).*
(Continued)

*Primary Examiner* — Timothy Kennedy
*Assistant Examiner* — Farah Taufiq
(74) *Attorney, Agent, or Firm* — Oblon, McClelland, Maier & Neustadt, L.L.P.

(57) ABSTRACT

A heat treatment furnace device for heat-treating precursor fiber bundles of carbon fibers, having: a heat treatment chamber, in which continuously supplied precursor fiber bundles are treated with hot air, a hot air circulation path, through which hot air from the heat treatment chamber returns to the heat treatment chamber, and a condensation/separation device, into which the hot air flowing through the hot air circulation path is introduced and separated into a condensate and a gas; wherein the condensation/separation device has:
a condensation treatment chamber and a condensation unit, which is provided in the condensation treatment chamber and has condensation surfaces on which the condensate is formed and allowed to drip down.

6 Claims, 6 Drawing Sheets

(51) Int. Cl.
  *D01F 9/32*   (2006.01)
  *B01D 8/00*   (2006.01)
  *B01D 53/00*  (2006.01)
  *F28D 7/12*   (2006.01)
  *B01D 46/30*  (2006.01)
  *F28B 1/06*   (2006.01)
  *F28D 21/00*  (2006.01)

(52) U.S. Cl.
  CPC ........... *B01D 46/30* (2013.01); *B01D 53/002* (2013.01); *D01F 9/22* (2013.01); *D01F 9/32* (2013.01); *F28B 1/06* (2013.01); *F28D 7/12* (2013.01); *B01D 2257/408* (2013.01); *F28D 2021/0063* (2013.01)

(56) References Cited

FOREIGN PATENT DOCUMENTS

| JP | 6-146121 A | 5/1994 |
|---|---|---|
| JP | 6-182106 A | 7/1994 |
| JP | 8-311723 A | 11/1996 |
| JP | 2008-95221 A | 4/2008 |
| JP | 2008-231610 A | 10/2008 |
| JP | 2010-222723 A | 10/2010 |
| JP | 2012-201997 A | 10/2012 |
| JP | 2012201997 A * | 10/2012 |
| JP | 2013-32608 A | 2/2013 |
| WO | 2006/090548 A1 | 8/2006 |
| WO | WO-2014157394 A1 * | 10/2014 |

OTHER PUBLICATIONS

International Search Report dated May 24, 2016 in PCT/JP2016/055447 filed Feb. 24, 2016.

European Office Action dated Jul. 24, 2020 in European Patent Application No. 16755558.0, 5 pages.

* cited by examiner

HEAT TREATMENT FURNACE DEVICE AND METHOD FOR PRODUCING CARBON FIBER BUNDLE

TECHNICAL FIELD

The present invention relates to a heat treatment furnace device used to produce carbon fiber bundles and a method for producing carbon fiber bundles.

The present application claims priority on the basis of Japanese Patent Application No. 2015-035036, filed in Japan on Feb. 25, 2015, the contents of which are incorporated herein by reference.

BACKGROUND ART

Pitch-based carbon fibers having pitch as the raw material thereof and PAN-based carbon fibers having polyacrylonitrile (PAN) as the raw material thereof are widely used as carbon fibers.

In the case of producing pitch-based carbon fibers, precursor fiber bundles composed of pitch-based fibers are first heated at 200° C. to 300° C. in a heat treatment furnace containing an air or other oxidizing gas atmosphere to subject the precursor fiber bundles to infusibilization treatment and obtain infusible fiber bundles. In the case of producing PAN-based carbon fibers, precursor fiber bundles composed of PAN-based fibers are heated at 200° C. to 300° C. in a heat treatment furnace containing an air or other oxidizing gas atmosphere to subject the precursor fiber bundles to flame-proofing treatment and obtain flame-resistant fiber bundles.

Pitch-based carbon fibers and PAN-based carbon fibers are respectively obtained by subjecting the infusible fiber bundles or flame-resistant fiber bundles obtained by infusibilization treatment or flame-proofing treatment in an oxidizing atmosphere (to be collectively referred to as oxidized fiber bundles) to carbonization treatment by heating at an even higher temperature in an inert gas atmosphere.

In the case of producing pitch-based carbon fibers or PAN-based carbon fibers in this manner, while the precursor fiber bundles are first heated in a heat treatment furnace containing an oxidizing gas atmosphere, a portion of the precursor fiber bundles undergo thermal decomposition at this time resulting in the formation of a tar component.

In addition, in the production of PAN-based carbon fibers, in the case of heating precursor fiber bundles composed of PAN-based fibers in a heat treatment furnace, a portion of an oil agent applied to the surface of the precursor fiber bundles is dispersed and suspended in the form of a mist or vaporized. The oil agent is used for the purpose of inhibiting fusion among the precursor fibers during flame-proofing treatment of the precursor fiber bundles composed of PAN-based fibers. The aforementioned mist or vapor of the oil agent may also gradually undergo deterioration induced by the high temperature of the heat treatment furnace resulting in the formation of a mist-like tar component. A silicone-based oil agent is frequently used as the oil agent since, in addition to having superior heat resistance, it is highly effective in inhibiting fusion among the precursor fibers. In the case of using a silicone-based oil agent, the silicone mist or vapor deteriorates due to the high temperature of the heat treatment furnace, which may result in the formation of a mist-like tar component and the subsequent formation of silica dust.

A hot air circulation type of heat treatment furnace is widely used when carrying out the aforementioned infusibilization treatment or flame-proofing treatment on an industrial scale. Hot air circulation types of heat treatment furnaces are composed to have a heat treatment chamber, into which the precursor fibers are continuously introduced and subjected to heat treatment, and a hot air circulation path that is connected to the heat treatment chamber, and hot air discharged from the heat treatment chamber is allowed to circulate by being returned to the heat treatment chamber through the hot air circulation path.

In the case of using such a hot air circulation type of heat treatment furnace, since the aforementioned mist-like tar component, dust and the like that have formed in the heat treatment furnace are contained in the hot air circulating through the heat treatment chamber and hot air circulation path, oxidized fibers having the tar component, dust and the like adhered thereto are produced as the tar component and dust adheres to the precursor fiber bundles heated in the heat treatment chamber. Since the tar component, dust and the like adhered to the oxidized fibers serve as starting points for the generation of fuzz and the occurrence of breakage in a subsequent step such as the carbonization step, the quality of the resulting carbon fiber bundles decreases considerably. In addition, this mist-like tar component, dust and the like blocks a perforated panel for rectifying hot air flow provided at the portion where hot air is blown into the heat treatment chamber from the hot air circulation path, thereby hindering the circulation of hot air. In this case, removal of heat from the precursor fiber bundles does not proceed smoothly and there is increased susceptibility to the occurrence of breakage of the precursor fiber bundles.

As has been described above, in the case of using a hot air circulation type of heat treatment furnace, there was the problem of a mist-like tar component, dust formed in the heat treatment furnace and contained in the hot air having a negative effect on the quality of carbon fiber bundles. Consequently, in the case of using a hot air circulation type of heat treatment furnace, it was necessary to frequently interrupt the operation thereof to clean the inside of the heat treatment furnace, making it difficult to operate the heat treatment furnace continuously over a long period of time. This problem impeded improvement of the productivity in making carbon fibers.

In response to such problems, Patent Document 1, for example, discloses a method for removing dust within a furnace using a filter made of heat-resistant fibers having a collection rate of 50% to 90% with respect to dust of a size of 2 μm.

Patent Document 2 discloses a method for removing dust with a filtration material unit of which 97% to 100% (based on volume) of the entire inside thereof is filled with an aggregate of ceramic or metal particles having a particle diameter of 2 mm to 80 mm.

Patent Document 3 discloses a method for separating the lightweight fraction of pitch generated during infusibilization treatment from hot air by cooling an oxidizing gas containing the lightweight pitch fraction and forming a mist of the lightweight pitch fraction followed by separating from the hot air using a metal mesh, porous body, filter or cyclone separator and the like.

PRIOR ART DOCUMENTS

Patent Documents

Patent Document 1: Japanese Unexamined Patent Application, First Publication No. 2008-95221

Patent Document 2: Japanese Unexamined Patent Application, First Publication No. 2010-222723

Patent Document 3: Japanese Unexamined Patent Application, First Publication No. H6-146121

DISCLOSURE OF THE INVENTION

Problems to be Solved by the Invention

However, the methods described in Patent Documents 1 and 2 are methods that use a filtration material. Consequently, although these methods are suitable for removing dust from a gas containing only dust, they cannot be said to be efficient methods for removing dust from a gas containing a mist-like tar component. This is because the tar component adheres to the surface of the filtration material in a short period of time thereby causing the filtration material to rapidly become clogged. Accordingly, the methods described in Patent Documents 1 and 2 that use a filtration material are unable to stably remove various impurities over a long period of time.

In addition, since the tar component containing dust that has become adhered to a filtration material is highly viscous, considerable effort is required to regenerate the filtration material.

In addition, the method of Patent Document 3 also has the problem of clogging of the filtration material in the same manner as in the case of Patent Document 1 or Patent Document 2 in the case of using a filtration material such as a metal mesh, porous body or filter, and considerable effort is required to regenerate the filtration materials in this case as well. In addition, in the case of a using a cyclone separator in the method described in Patent Document 3, when mist having a small particle diameter is attempted to be removed, it is necessary to reduce the diameter of the rotating portion of the cyclone separator. In this case, an extremely large number of cyclone separators are required to treat a large amount of hot air, thereby making this unrealistic.

With the foregoing in view, an object of the present invention is to provide a heat treatment furnace device, which is able to stably separate and remove impurities containing a mist-like tar component, dust and the like contained in hot air discharged from the heat treatment furnace to heat precursor fiber bundles of carbon fibers, and allows continuous operation over a long period of time, and to provide a method for producing carbon fiber bundles.

Means for Solving the Problems

The present invention has the configurations indicated below.

A heat treatment furnace device for heat-treating precursor fiber bundles of carbon fibers, having:

a heat treatment chamber, in which continuously supplied precursor fiber bundles are treated with hot air at 200° C. to 300° C., a hot air circulation path, through which hot air discharged from the heat treatment chamber returns to the heat treatment chamber, and a condensation/separation device, into which at least a portion of the hot air flowing through the hot air circulation path is introduced and separated into a condensate and a gas; wherein the condensation/separation device has:

a condensation treatment chamber, into which at least a portion of the hot air is introduced and from which the gas is discharged from a gas outlet, and a condensation unit, which is provided in the condensation treatment chamber and has condensation surfaces on which the condensate is formed and allowed to drip down; wherein the condensation surfaces are protected with a low viscosity liquid.

[2] A heat treatment furnace device for heat-treating precursor fiber bundles of carbon fibers, having:

a heat treatment chamber, in which continuously supplied precursor fiber bundles are treated with hot air at 200° C. to 300° C., a hot air circulation path, through which hot air discharged from the heat treatment chamber returns to the heat treatment chamber, and a condensation/separation device, into which at least a portion of the hot air flowing through the hot air circulation path is introduced and separated into a condensate and a gas; wherein the condensation/separation device has:

a condensation treatment chamber, into which at least a portion of the hot air is introduced, and a condensation unit, which is provided in the condensation treatment chamber and has condensation surfaces on which the condensate is formed and allowed to drip down; wherein the surface temperature of the condensation surfaces is 0° C. to 100° C., and the temperature of the gas discharged from a gas outlet formed in the condensation treatment chamber is higher than the surface temperature of the condensation surfaces.

[3] The heat treatment furnace device according to [1] or [2], which satisfies the following relational expression (1):

$$10 \leq Y/A \leq 1000 \tag{1}$$

(wherein Y refers to the gas flow rate (Nm$^3$/hr) of hot air introduced into the condensation treatment chamber from the hot air circulation path, and A refers to the surface area (m$^2$) of the condensation surfaces).

[4] The heat treatment furnace device according to any of [1] to [3], wherein the temperature of the gas at the gas outlet is 100° C. to 150° C.

[5] The heat treatment furnace device according to any of [1] to [4], wherein the temperature of the hot air at a hot air inlet formed in the condensation treatment chamber is 100° C. to 300° C.

[6] The heat treatment furnace device according to any of [1] to [5], wherein a condensate collection unit that collects the condensate dripping down from the condensation surfaces is arranged below the condensation treatment chamber, and the surface temperature of the condensate collection unit is 0° C. to 100° C.

[7] The heat treatment furnace device according to in [6], wherein the surface temperature of the inner walls of the condensation treatment chamber is higher than the surface temperature of the condensation surfaces and the surface temperature of the condensate collection unit.

[8] The heat treatment furnace device according to any of [1] to [7], wherein a return path by which the gas discharged from the gas outlet is returned to the hot air circulation path is provided.

[9] The heat treatment furnace device according to any of [1] to [8], which satisfies the following relational expression (2):

$$1 \leq (X+Y)/Z \leq 500 \tag{2}$$

(wherein X refers to the amount of fresh air per unit time (Nm$^3$/hr) that is supplied to the heat treatment furnace device, Y refers to the air flow rate (Nm$^3$/hr) of hot air introduced into the condensation treatment chamber from the hot air circulation path, and Z refers to the supply rate (kg/hr) at which precursor fiber bundles are supplied to the heat treatment chamber).

[10] The heat treatment furnace device according to any of [1] to [9], wherein the arithmetic average surface roughness Ra of the condensation surfaces (JIS B 0601-2001) is 1 nm to 200 μm.

[11] A method for producing oxidized fiber bundles such that a condensate is separated from at least a portion of hot air discharged from the heat treatment chamber and the hot air is circulated by returning to the heat treatment chamber, while precursor fiber bundles of carbon fibers are continuously supplied to a heat treatment chamber, heat-treated at 200° C. to 300° C. with hot air containing an oxidizing substance, and extracted from the heat treatment chamber to obtain oxidized fiber bundles;
wherein
the condensate is separated by trapping it on the condensation surfaces at 0° C. to 100° C. that are protected with a low viscosity liquid.

[12] A method for producing oxidized fiber bundles such that a condensate is separated from at least a portion of hot air discharged from the heat treatment chamber and the hot air is circulated by returning to the heat treatment chamber, while precursor fiber bundles of carbon fibers are continuously supplied to a heat treatment chamber, heat-treated at 200° C. to 300° C. with hot air containing an oxidizing substance, and extracted from the heat treatment chamber to obtain oxidized fiber bundles;
wherein
the condensate is formed on and allowed to drip down from condensation surfaces having a surface temperature of 0° C. to 100° C., and
the temperature of hot air immediately after separation of the condensate is higher than the surface temperature of the condensation surfaces.

[13] The method for producing oxidized fiber bundles according to [12], wherein the surfaces of the condensation surfaces are protected with a low viscosity liquid that has condensed from the hot air.

[14] The method for producing oxidized fiber bundles according to any of [11] to [13], which satisfies the following relational expression (1):

$$10 \leq Y/A \leq 1000 \quad (1)$$

(wherein Y refers to the gas flow rate (Nm$^3$/hr) of at least a portion of hot air discharged from the heat treatment chamber from which the condensate is separated, and A refers to the surface area (m$^2$) of the condensation surfaces).

[15] The method for producing oxidized fiber bundles according to any of [11] to [14], wherein the temperature of hot air immediately after separation of the condensate is 100° C. to 150° C.

[16] The method for producing oxidized fiber bundles according to any of [11] to [15], wherein the temperature of hot air immediately before separation of the condensate is 100° C. to 300° C.

[17] A method for producing oxidized fiber bundles carried out using the heat treatment furnace device according to any of [1] to [10], wherein a condensate is separated from at least a portion of hot air discharged from the heat treatment chamber and the hot air is circulated by returning to the heat treatment chamber, while precursor fiber bundles of carbon fibers are continuously supplied to a heat treatment chamber, heat-treated at 200° C. to 300° C. with hot air containing an oxidizing substance, and extracted from the heat treatment chamber to obtain oxidized fiber bundles.

[18] The method for producing oxidized fiber bundles according to any of [11] to [17], wherein the precursor fiber bundles are composed of polyacrylonitrile-based fibers.

[19] A method for producing carbon fiber bundles, wherein oxidized fiber bundles are produced by the method for producing oxidized fiber bundles according to any of [11] to [18] and the oxidized fiber bundles are carbonized in an inert atmosphere at 800° C. or higher.

Effects of the Invention

According to the present invention, a heat treatment furnace device and a method for producing carbon fiber bundles can be provided that are able to stably separate and remove impurities containing a mist-like or vaporized oil agent, mist-like tar component, dust and the like contained in hot air discharged from a heat treatment furnace used to heat precursor fiber bundles of carbon fibers, and enable long-term continuous operation.

BEST MODE FOR CARRYING OUT THE INVENTION

The following provides a detailed explanation of the present invention using as an example the case of producing PAN-based carbon fibers using PAN-based fibers for the precursor fiber bundles. The heat treatment furnace device of the present invention can also be used in the case of producing pitch-based carbon fibers from precursor fiber bundles composed of pitch-based fibers.

[Heat Treatment Furnace Device]

Figure 1:
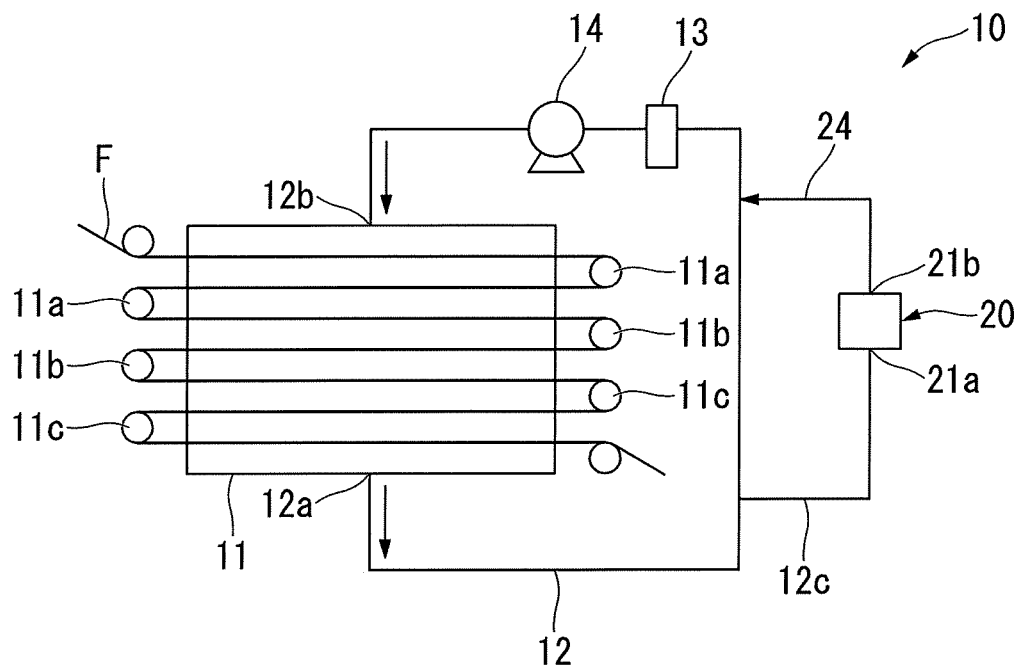
FIG. 1 is a schematic configuration diagram showing an example of the configuration of a heat treatment furnace device of the present embodiment.

FIG. 1 is a schematic configuration diagram showing the configuration of a heat treatment furnace device of the present embodiment.

A heat treatment furnace device 10 of the present embodiment is used for subjecting a PAN-based precursor fiber bundle F to flame-proofing treatment (heat treatment), and has a heat treatment chamber 11, in which heat treatment on the PAN-based precursor fiber bundle F is carried out, a hot air circulation path 12, through which hot air discharged from the heat treatment chamber 11 is circulated by returning the hot air to the heat treatment chamber 11, and a condensation/separation device 20, into which at least a portion of hot air flowing through the hot air circulation path 12 is introduced and in which the introduced hot air is separated into a condensate and a gas.

(Heat Treatment Chamber)

To the heat treatment chamber 11 the PAN-based precursor fiber bundle F is continuously introduced and hot air is continuously supplied from the hot air circulation path 12. Heat treatment is carried out in the heat treatment chamber 11 by heating to preferably 200° C. to 300° C. (temperature inside furnace), more preferably 220° C. to 280° C. and even more preferably 230° C. to 260° C., and as a result thereof, the PAN-based precursor fiber bundle F undergoes flame-proofing treatment resulting in obtaining of flame-resistant fiber bundles. Furthermore, the flame-resistant fiber bundles obtained here may be partially flame-resistant fiber bundles that have not completely undergone flame-proofing treatment. Hereinafter "flame-resistant fiber bundles" includes partially flame-resistant fiber bundles.

Although there are no particular limitations on the hot air provided it is a gas that contains an oxidizing substance such as oxygen or nitrogen dioxide, from the viewpoint of industrial production, atmospheric air is used preferably in consideration of economical and safety factors. In addition, oxygen concentration in the hot air may be changed for the purpose of adjusting oxidation capacity.

An intake port (not shown) and an exhaust port (not shown) are formed in the heat treatment chamber 11, and fresh air heated to a prescribed temperature may be continuously supplied from the intake port while hot air in the heat treatment chamber 11 may be continuously discharged from the exhaust port. As a result, the concentration of gases such as HCN generated from the PAN-based precursor fiber bundle F can be held less than a certain value.

In the example of FIG. 1, a plurality of the PAN-based precursor fiber bundle F is continuously introduced into the heat treatment chamber 11 from the outside in the state of a group of fiber bundles arranged in the form of a sheet within the same plane. Subsequently, the PAN-based precursor fiber bundle F travels while entering and leaving the heat treatment chamber 11 by being turned around a plurality of times by a plurality of sets of fold-back rollers arranged outside the heat treatment chamber 11.

For example, in the example shown in FIG. 1, three sets of fold-back rollers consisting of rollers 11a & 11a, rollers 11b & 11b and rollers 11c & 11c are provided outside the heat treatment chamber 11, and as a result thereof, the group of fiber bundles enters and leaves the heat treatment chamber 11. Here, a single entry to or exit from the heat treatment chamber 11 is referred to as a "pass". Although the number of passes is 7 in the example of FIG. 1, there are no particular limitations on the number of passes and it is suitably designed according to the scale and so forth of the heat treatment furnace device 10.

(Hot Air Circulation Path)

The hot air circulation path 12 is a flow path for returning hot air discharged from the heat treatment chamber 11 to the heat treatment chamber 11. The ends of the hot air circulation path 12 on the upstream side and downstream side are both connected to the heat treatment chamber in an open state. The end of the hot air circulation path on the upstream side thereof consists of a hot air intake port 12a that draws in hot air discharged from the heat treatment chamber 11, while the end of the hot air circulation path 12 on the downstream side thereof consists of a hot air blowout port 12b that blows out hot air returning to the heat treatment chamber 11 into the heat treatment chamber 11.

Pressure loss is preferably increased by arranging a perforated panel (not shown) and the like on the end surface (blowout side) of the hot air blowout port 12b. As a result, hot air is blown into the heat treatment chamber 11 from the hot air blowout port 12b at a uniform air flow rate all over the end surface thereof.

Although not required, pressure loss may also be generated by arranging a perforated panel (not shown) and the like on the end surface (intake side) of the hot air intake port 12a in the same manner as in the case of the hot air blowout port 12b. Pressure loss at the hot air intake port 12a is suitably determined as necessary.

A hot air heating means 13 and a fan (a blower) 14 are arranged at an intermediate location of the hot air circulation path 12, and hot air heated by the hot air heating means 13 is blown by the fan 14.

Any known hot air heating means such as an electric heater can be used for the hot air heating means 13 and there are no particular limitations thereon. Any known fan such as an axial flow fan can be used for the fan 14 and there are no particular limitations thereon.

Although hot air from the hot air blowout port 12b of the hot air circulation path 12 is drawn in perpendicular to the direction of travel of the PAN-based precursor bundle F traveling through the heat treatment chamber 11 in this example, it may also be blown in parallel to that direction of travel, and there are no particular limitations on the angle formed between the direction of travel of the PAN-based precursor fiber bundle F and the direction in which hot air is blown in.

An exhaust port (not shown) may be provided in the hot air circulation path 12 that discharges hot air within the hot air circulation path 12 to the outside in order to hold the concentration of HCN or other gases generated from the PAN-based precursor fiber bundle F less than a certain value. In addition, an intake port (not shown) may also be provided that supplies outside air to the hot air circulation path 12. The exhaust port and intake port are preferably provided on the upstream side of the hot air heating means 13 in the hot air circulation path 12.

(Condensation/Separation Device)

The condensation/separation device 20 is a device into which at least a portion of the hot air flowing through the hot air circulation path 12 is introduced and in which the hot air introduced thereto is separated into a condensate containing impurities and a gas having a low level of impurities. In this example, the separated gas is returned to the hot air circulation path 12 and supplied to the heat treatment chamber 11.

Examples of impurities contained in the hot air flowing through the hot air circulation path 12 include fine droplets (mist) and vapor of surfactant components, silicone compounds, degeneration products thereof and degradation products thereof contained in the oil agent applied to the PAN-based precursor fiber bundle F; fine droplets (mist) and vapor of low molecular weight compounds generated by partial decomposition of the PAN-based polymer composing the PAN-based precursor fiber bundle F, degeneration products thereof and degradation products thereof; and, dust adhering to the PAN-based precursor fiber bundle F and carried into the heat treatment chamber from the outside, dust contained in outside air (fresh air) that flows into the heat treatment furnace device, and dust of silicon oxide-based compounds formed by exposure of fine liquid droplets (mist) or a vapor of silicone compounds, deterioration products thereof or degradation products thereof to high temperatures; and, once these impurities have been separated from the hot air, they normally undergo phase separation into a low viscosity liquid and a tar-like highly viscous liquid containing dust and the like. Here, a low viscosity liquid refers to a mixture of surfactant components and silicone compounds contained in the oil agent applied to the PAN-based precursor fiber bundle F.

Figure 2:
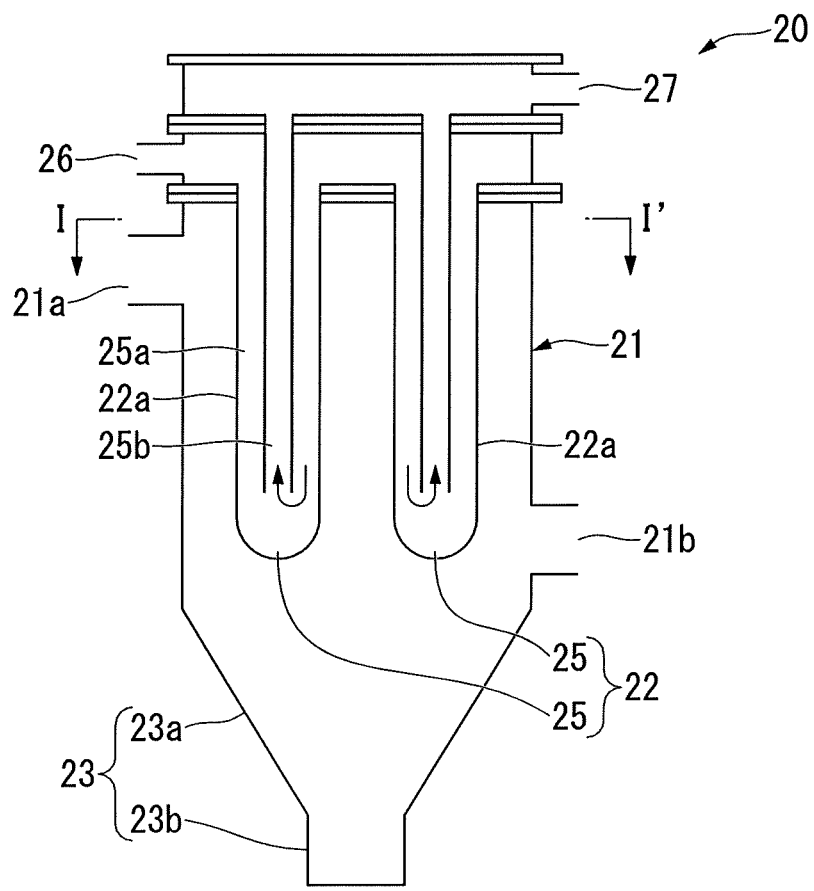
FIG. 2 is a schematic cross-sectional drawing showing an example of the configuration of a condensation/separation device of the present embodiment.
Figure 3:
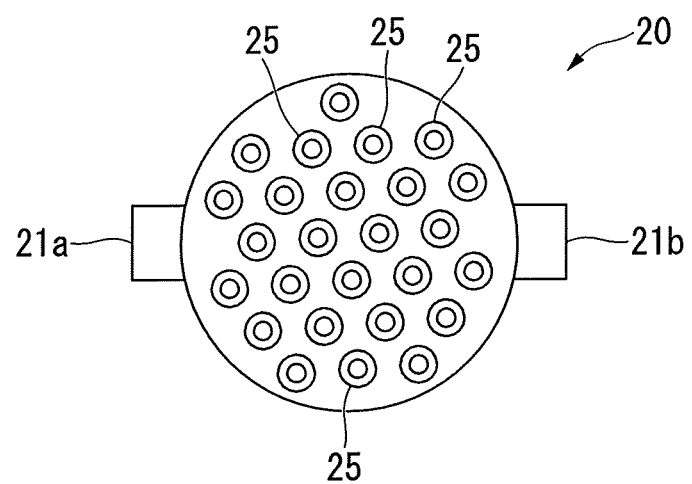
FIG. 3 is a transverse cross-sectional drawing taken along line I-I' in FIG. 2.

FIG. 2 is a longitudinal cross-sectional drawing schematically showing the configuration of the condensation/separation device 20 provided in the heat treatment furnace device 10 of FIG. 1, while FIG. 3 is a transverse cross-sectional drawing taken along line I-I' of FIG. 2.

Furthermore, in the longitudinal cross-sectional drawing of FIG. 2, only two of a large number of straight tubes 25 are depicted for the purpose of facilitating understanding.

The condensation/separation device 20 of the example shown in FIG. 2 has a condensation treatment chamber 21 into which hot air from the hot air circulation path 12 is introduced, and a condensation unit 22 provided in the condensation treatment chamber 21 that has condensation surfaces 22a formed therein on which a condensate is formed by cooling hot air introduced thereto.

The condensation treatment chamber 21 of this example is in the form of a cylinder having a constant diameter, and is arranged so that the center line thereof coincides with the vertical direction. A condensate collection unit 23 for receiving and collecting condensate that has dripped down from the condensation surfaces 22a in the vertical direction due to the force of gravity is continuously formed on the lower end of the condensation treatment chamber 21. The condensate collection unit 23 is in the shape of a funnel and has a narrowing portion 23a that becomes narrower towards the lower end and a lower portion 23b having a constant diameter and formed in continuation from the narrowing portion 23a. The lower end of the lower portion 23b can be opened and closed.

A hot air inlet 21a is formed in the condensation treatment chamber 21, and hot air from a branched path 12c that branches from the hot air circulation path 12 is introduced into the condensation treatment chamber 21 from the aforementioned hot air inlet 21a. A gas outlet 21b is formed in the condensation treatment chamber 21, and gas is discharged from the gas outlet 21b after the condensate has been separated. Although there are no particular limitations on the locations where the hot air inlet 21a and gas outlet 21b are formed in the condensation treatment chamber 21, the gas outlet 21b is preferably arranged below the hot air inlet 21a as shown in the examples shown in FIGS. 2, 5 and 6 to promote downward dripping of impurities that have condensed on the condensation surfaces 22a.

In addition, in this example, a return path 24 is connected to the gas outlet 21b, and gas is returned to the hot air circulation path 12 through the return path 24 following separation of condensate.

In this type of condensation/separation device 20, as a result of returning hot air to the hot air circulation path 12 after having treated the hot air and reduced the levels of various impurities, impurities contained in the hot air can be inhibited from adhering to the PAN-based precursor fiber bundle F in the heat treatment chamber 11, and the generation of fuzz and the occurrence of breakage can be reduced in the flame-proofing step and subsequent carbonization step. Accordingly, high-quality carbon fibers can be stably produced.

In addition, in the case of arranging a perforated plate and the like on the end surfaces of the hot air blowout port 12b and hot air intake port 12a, blocking of these ports can be reduced.

The location where the branched path 12c branches from the hot air circulation path 12 is preferably farther upstream than the hot air heating means 13 in the hot air circulation path 12. Since impurities undergo a chemical reaction and polymerize as a result of making contact with a heated surface such as the surface of the heater of the hot air heating means 13, thereby increasing their adhesion to the PAN-based precursor fiber bundle F in the heat treatment chamber 11 or resulting in the formation of dust by degenerating into a silicon oxide compound, impurities are preferably separated farther upstream than the hot air heating means 13. However, in the case of employing a configuration in which impurities are removed from the entire amount of hot air farther upstream than the hot air heating means 13, the device becomes unnecessarily large, which cannot be said to be preferable in terms of energy efficiency. Consequently, the condensation/separation device 20 is preferably connected to the branched path 12c by providing the branched path 12c (hot air bypass path) farther upstream than the hot air heating means 13 in this manner.

The location where the return path 24 is connected to the hot air circulation path 12 is preferably farther upstream than the hot air heating means 13. Since gas returned from the condensation/separation device 20 to the hot air circulation path 12 through the return path 24 is lower in temperature, the gas is required to be heated to a prescribed temperature prior to being introduced into the heat treatment chamber 11. With regard to this point, if the return path 24 is connected to the hot air circulation path 12 farther upstream than the hot air heating means 13, a mixed gas consisting of gas returned from the condensation/separation device 20 and gas circulated through the hot air circulation path 12 can be heated by the hot air heating means 13, thereby enabling the mixed gas to be heated to a prescribed temperature without causing any temperature discrepancies.

Furthermore, another hot air heating means maybe provided in the return path 24 to heat the gas. There are no particular limitations on this hot air heating means, and any known hot air heating means such as an electric heater may be used.

In addition, any known fan such as an axial flow fan may be provided for circulating gas in the branched path 12c or return path 24.

The condensation unit 22 is provided with a mechanism for condensing impurities in the form of a vapor, mist and dust contained in the hot air by cooling the hot air.

Figure 5:
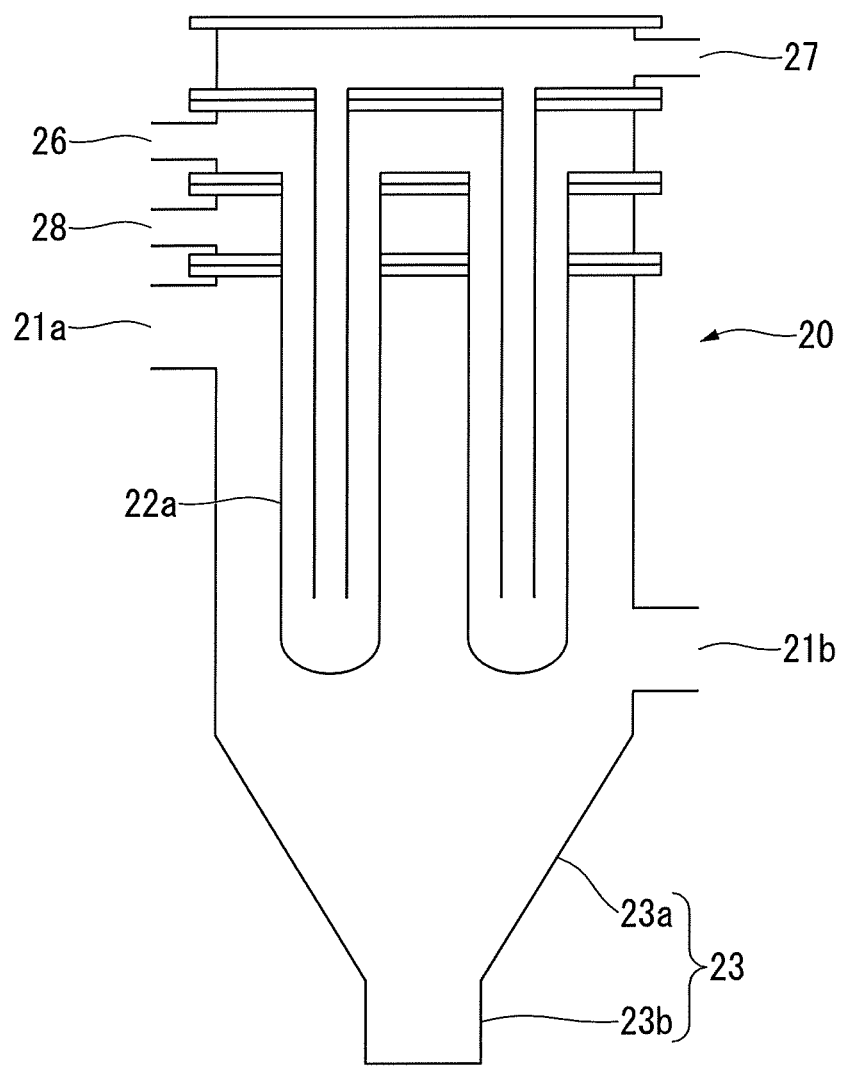
FIG. 5 is a schematic cross-sectional drawing showing an example of the configuration of a condensation/separation device of the present embodiment.
Figure 6:
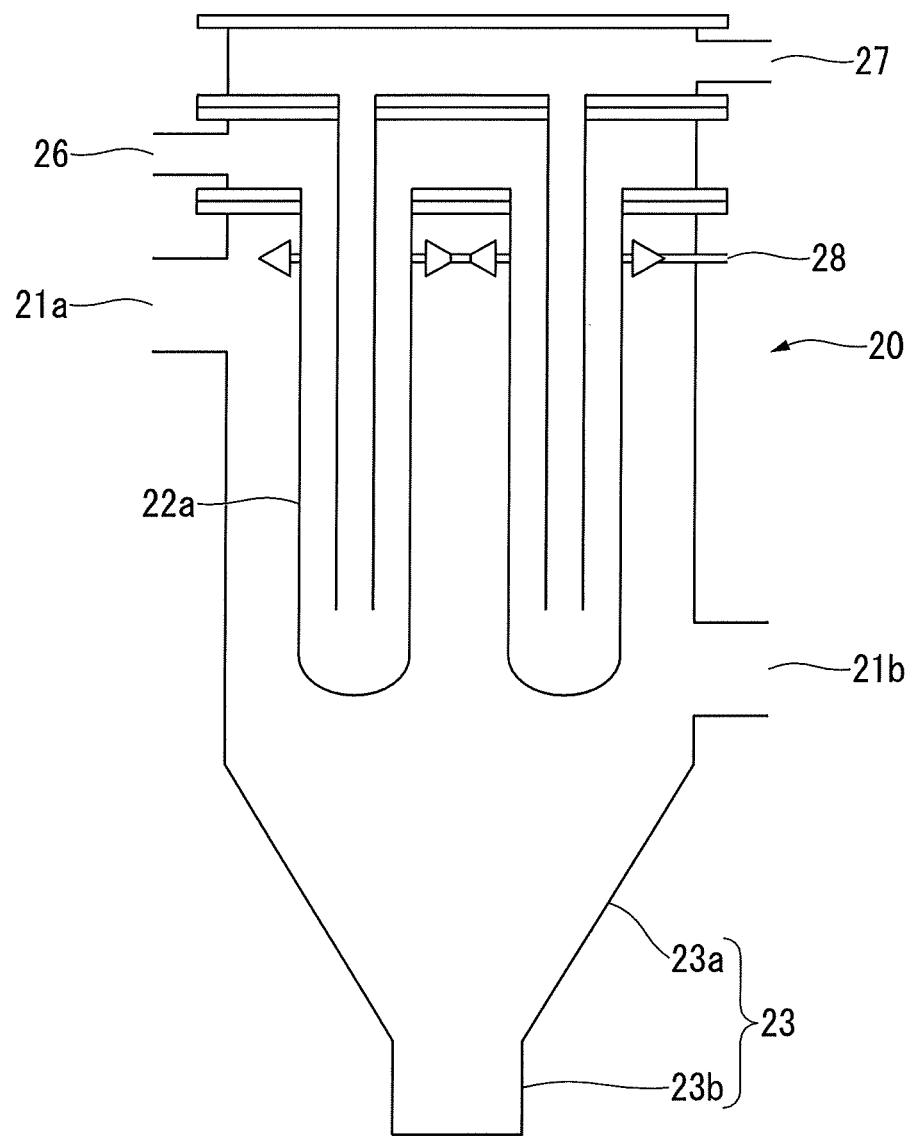
FIG. 6 is a schematic cross-sectional drawing showing an example of the configuration of a condensation/separation device of the present embodiment.

The condensation unit 22 of the examples shown in FIGS. 2, 5 and 6 is composed of a straight tube-type heat exchanger provided with a large number of tube-in-tube straight tubes 25, and the surfaces of all of the straight tubes 25 serve as condensation surfaces 22a controlled to within a temperature range of 0° C. to 100° C. with a coolant to be subsequently described. Since the straight tube-type heat exchanger has a simple shape in which the surfaces of the straight tubes 25 serve as the condensation surfaces 22a, even in the case a tar-like highly viscous liquid has become adhered to the condensation surfaces 22a, the highly viscous liquid is easily removed, thereby making this preferable. In addition, in this example, each of the straight tubes 25 is removably attached, thereby enabling them to be replaced with new tubes as necessary.

A coolant inlet 26 and a coolant outlet 27 are provided to the condensation treatment chamber 21, enabling coolant for cooling the condensation surfaces 22a to enter an outer portion 25a of each straight tube 25 from the coolant inlet 26 and leave from the coolant outlet 27 after having passed through the inner portion 25b.

There are no particular limitations on the coolant, and although any gas or liquid can be used, water is used preferably from the viewpoint of easier maintenance.

Furthermore, outside air may be supplied to the aforementioned condensation treatment chamber 21 by providing an intake port (not shown) in the branched path 12c in order to hold the concentration of HCN and other gases generated from the PAN-based precursor fiber bundle F in the condensation treatment chamber 21 less than a certain value. In this case, the outside air also performs the action of cooling hot air introduced into the condensation treatment chamber 21.

In these examples, each straight tube 25 is provided so that the axial direction thereof coincides with the vertical direction. Consequently, tar-like highly viscous liquid adhered to the condensation surfaces 22a smoothly flows over the condensation surfaces 22a and easily drips down. The aforementioned axial direction is preferably such that the angle with respect to the horizontal direction is as close to 90° (vertical direction) as possible, and is preferably an angle of 50° to 90°, for the reason described above. If the angle is 50° or more, the tar-like highly viscous liquid flows smoothly over the condensation surfaces 22a, thereby reducing the risk of adhering to and accumulating on the condensation surfaces 22a as a result of not dripping down therefrom.

Furthermore, the condensation surfaces may be curved surfaces.

In addition, the condensation/separation device 20 of the examples shown in FIGS. 5 and 6 is provided with a mechanism that actively supplies a separating liquid to the condensation surfaces 22a to prevent the tar component from adhering to the condensation surfaces. In the example shown in FIG. 5, a separating liquid supplied through a separating liquid supply port 28 flows down from a slit provided near the base of the tube-in-tube straight tubes over the condensation surfaces in the form of a liquid film. In the example shown in FIG. 6, separating liquid supplied from the separating liquid supply port 28 flows down over the condensation surfaces in the form of a liquid film after having been sprayed in the vicinity of the base of the tube-in-tube straight tubes.

The separating liquid has the same action as a low viscosity liquid that is deposited on the condensation surfaces in the condensation/separation device shown in FIG. 2. A liquid having a high boiling point and low viscosity can be used for the separating liquid. Although the separating liquid may be a liquid that is compatible with the tar component or a liquid that undergoes phase separation therewith, a liquid that undergoes phase separation from the tar component is preferable from the viewpoint of being able to recycle the separating liquid from a mixture of the separating liquid and tar component.

For using as the separating liquid, using a liquid able to be used as an oil agent used for oil agent treatment of PAN-based precursor fiber bundles, or respective liquid components contained in the oil agents, either alone or as a mixture thereof, is preferable since it has little effect on carbon fibers produced with the heat treatment furnace device of the present invention. Among these, an emulsifier component contained in the oil agent is used preferably.

Although the example of the condensation unit 22 shown in these examples consists of a tube-in-tube straight tube-type heat exchanger provided with a large number of straight tubes 25, there are no particular limitations on the form of the condensation unit, and any forms having a simple structure that facilitates cleaning of the condensation surfaces and able to be replaced as necessary are preferable.

For example, examples of the condensation unit 22 other than the aforementioned tube-in-tube straight tube-type heat exchanger include a vertical U-shaped heat exchanger, floating tube-type heat exchanger, kettle reboiler-type heat exchanger, coil-type heat exchanger, trombone-type heat exchanger, plate heat exchanger and spiral heat exchanger. A single tube type heat exchanger or multi tube type heat exchanger can be selected corresponding to the shape of the heat exchanger.

In particular, the tube-in-tube straight tube-type heat exchanger shown in FIGS. 2, 5 and 6 or a vertical U-shaped heat exchanger (not shown) is preferable from the viewpoint of having a simple structure that facilitates cleaning of the condensation surfaces 22a. A U-shaped heat exchanger is preferably provided so that the ends of the U-shaped foldback portions are facing downward and the axial direction of those portions in the form of straight tubes is such that the angle thereof with respect to the horizontal direction is within the aforementioned range. In addition, each U-shaped tube is preferably removably attached enabling it to be replaced with a new tube as necessary.

The condensation surfaces 22a preferably have substantially no horizontal portion. Tar-like highly viscous liquid adhered to the condensation surfaces 22a moves downward over the condensation surfaces 22a and drips down in the vertical direction from the lower ends of the condensation surfaces 22a. Namely, downward movement of highly viscous liquid and downward dripping from the lower ends take place on the condensation surfaces 22a. This behavior proceeds more smoothly if the condensation surfaces 22a have substantially no horizontal portion.

The condensation surfaces 22a preferably do not have fins (projections) for improving heat transfer efficiency in the manner of typical heat exchangers. This is because the presence of fins makes tar-like highly viscous liquid prone to accumulate in and adhere to gaps formed at the base of the fins and in gaps between the fins.

The surface free energy of the condensation surfaces 22a is preferably within the range of 10 mN/m to 2000 mN/m. If the surface free energy is 2000 mN/m or less, affinity between the tar-like highly viscous liquid and condensation surfaces 22a decreases and the highly viscous liquid tends to flow over and drop from the condensation surfaces 22a easily. The surface free energy of the condensation surfaces 22a can be controlled to within the aforementioned range by suitably selecting the material of the condensation surfaces 22a or subjecting the condensation surfaces 22a to surface treatment and the like.

The arithmetic average surface roughness Ra of the surfaces of the condensation surfaces 22a is preferably 1 nm to 200 μm, more preferably 1 nm to 10 μm and even more preferably 1 nm to 5 μm. If the arithmetic average surface roughness Ra of the surfaces of the condensation surfaces 22a is 200 μm or less, it is difficult for tar-like highly viscous liquid to enter surface irregularities in the condensation surfaces 22a. Consequently, downward movement of the highly viscous liquid over the condensation surfaces 22a and downward dripping from the condensation surfaces 22a are unlikely to be inhibited.

In addition, since it is difficult for highly viscous liquid to enter surface irregularities in the condensation surfaces 22a, there is less likelihood of the occurrence of problems such as the highly viscous liquid present in surface irregularities of the condensation surfaces 22a becoming adhered to and accumulating on the condensation surfaces 22a as a result of being exposed to hot air that leads to a decrease in condensation performance. On the other hand, if the arithmetic average surface roughness Ra of the condensation surfaces 22a is 1 nm or more, costs required for surface treatment for adjusting roughness Ra of the condensation surfaces 22 are not excessively high.

Figure 7:
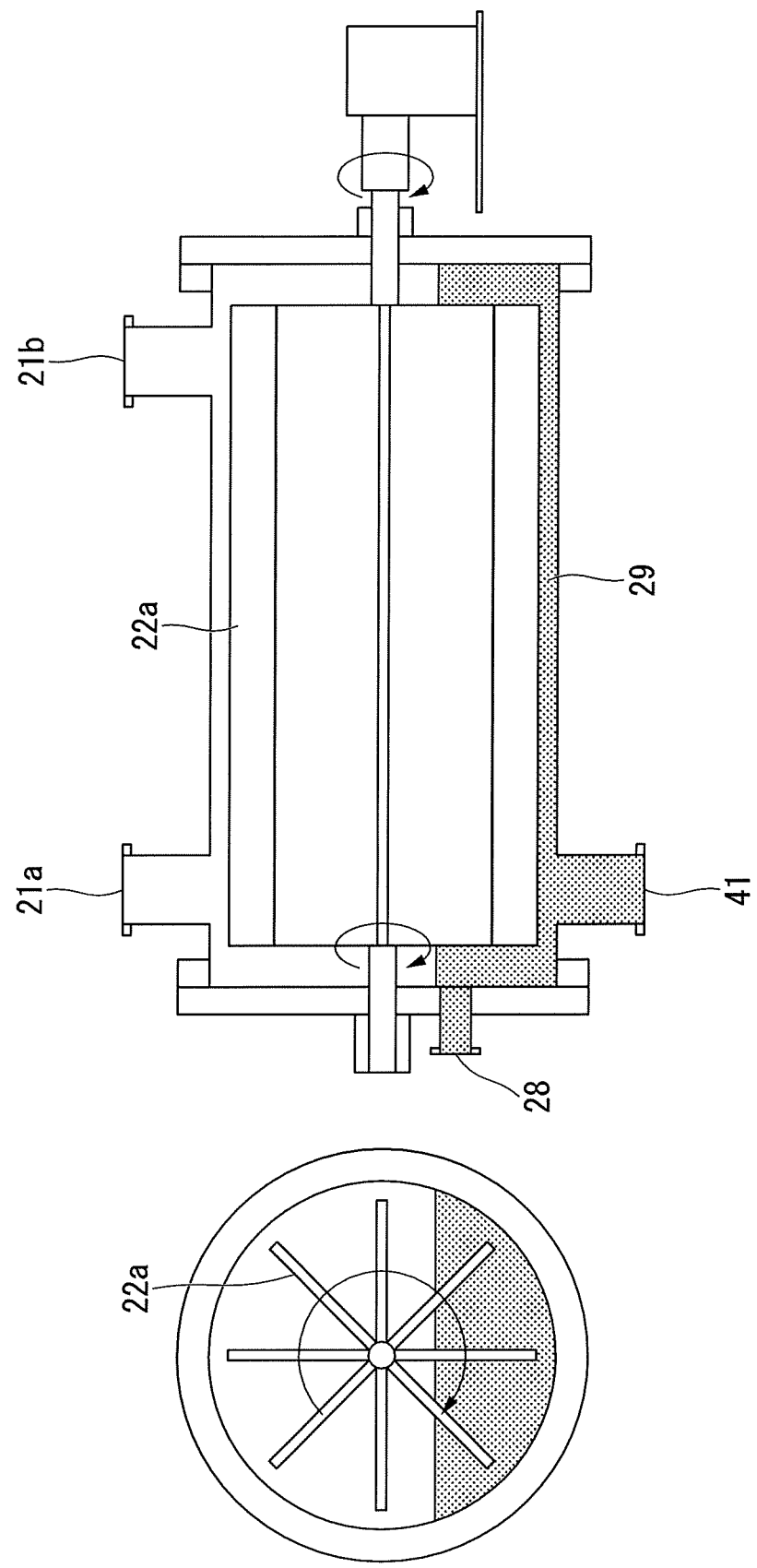
FIG. 7 is a schematic cross-sectional drawing showing an example of the configuration of a condensation/separation device of the present embodiment.
Figure 8:
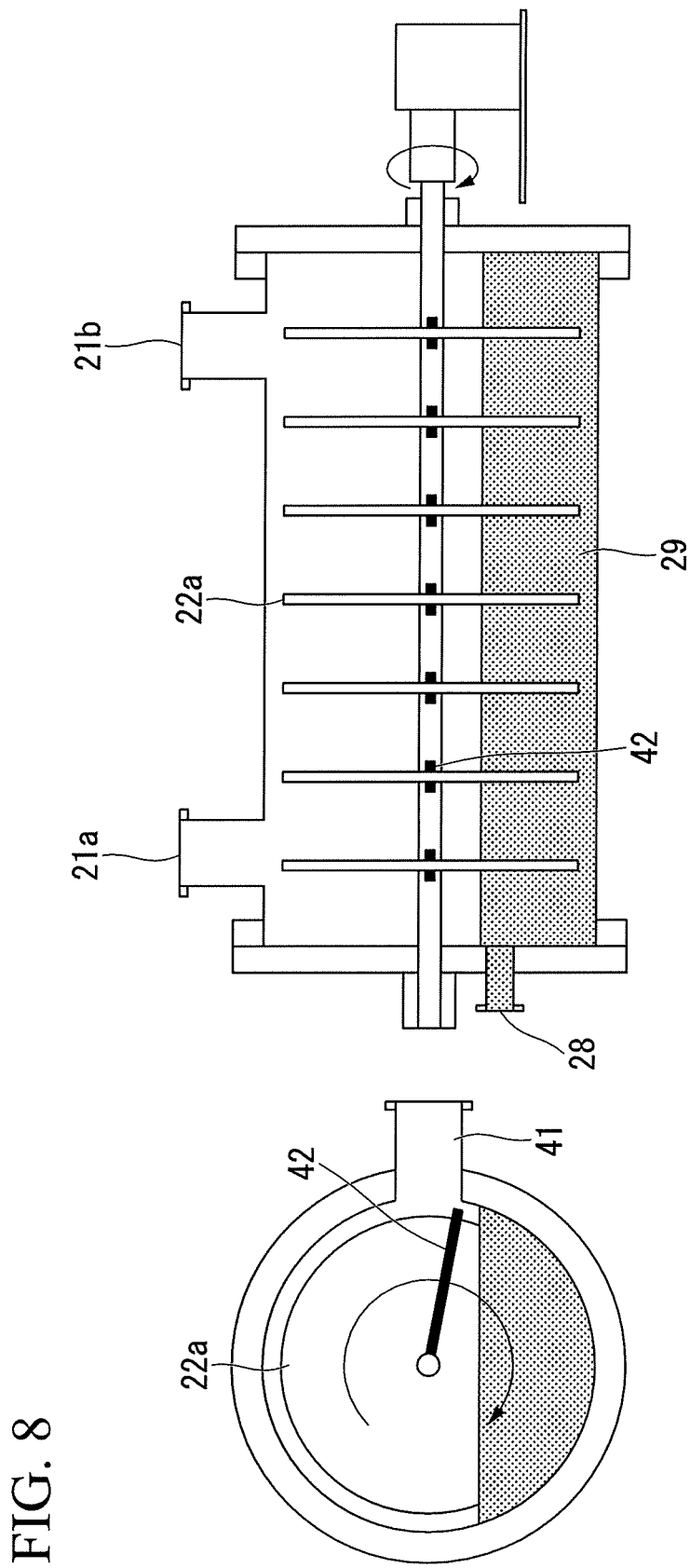
FIG. 8 is a schematic cross-sectional drawing showing an example of the configuration of a condensation/separation device of the present embodiment.

In addition, as exemplified in FIGS. 7 and 8, the condensation surfaces 22a can also be circulated so that condensation surfaces 22a immersed in a separating liquid reservoir 29 make contact with hot air. In this case, although cooling can be carried out by passing coolant through plate-shaped members that compose the condensation surfaces, cooling can also be carried out by providing cooling pipes in the separating liquid reservoir 29 (neither of which is shown in the drawings). Impurities such as a tar component become adhered during the time the condensation surfaces 22a moves through the hot air. FIG. 7 shows an example in which separating liquid that has captured a tar component and the like present in hot air by being adhered to the condensation surfaces 22a is again returned to the separating liquid reservoir 29, while FIG. 8 shows an example in which separating liquid that has captured a tar component and the like present in hot air by being adhered to the condensation surfaces 22a is recovered by being scraped from the condensation surfaces 22a prior to the condensation surfaces 22a again being immersed in the separating liquid reservoir 29.

As was previously described, the condensate collection unit 23 is formed in the shape of a funnel, and is provided at a location that enables it to receive and collect condensate that has dripped down in the vertical direction from the condensation surfaces 22a.

A mechanism that discharges collected impurities outside the system while retaining the fluidity thereof is preferably provided in the condensate collection unit 23. There are no particular limitations on this mechanism, and for example, with the lower end of the condensate collection unit 23 serving an opening that can be opened and closed, a piping (not shown) having a double valve (not shown) can be connected in continuation from the bottom thereof, and collected impurities can be discharged outside the device in batches by opening and closing the aforementioned double valve. When such a discharge mechanism is provided, impurities can be suitably discharged even if operation of the heat treatment furnace device 10 is not stopped, highly viscous liquid contained in the impurities is exposed to hot air for a long period of time, and the heat treatment furnace device 10 can be operated stably and continuously while preventing crosslinking and accumulation of highly viscous liquid.

Furthermore, the condensate collection unit 23 need not necessarily be provided, and for example, the lower end of the condensation treatment chamber 21 may be left open. In this case, a collection container and the like capable of receiving condensate that has dripped down from the condensation surfaces 22a may be separately provided outside the heat treatment furnace device 10. In addition, even in the case the condensate collection unit 23 is provided, the lower end thereof may be left open and condensate may be allowed to accumulate in a separately provided collection container and the like.

This type of condensation/separation device 20 has a condensation unit 22 having the condensation surfaces 22a formed therein which are controlled to a temperature range of 0° C. to 100° C., and hot air (gas) containing impurities introduced into the condensation treatment chamber 21 of the condensation/separation device 20 contacts the condensation surfaces 22a. Whereupon, impurities in the form of a mist and vapor condense on the surfaces of the condensation surfaces 22a resulting in the formation of a tar-like highly viscous liquid that adheres to the condensation surfaces 22a. Dust contained in the impurities becomes nuclei that promote condensation of the mist-like and vapor-like impurities. In addition, even if the dust does not form nuclei, the dust adheres to the highly viscous liquid after the highly viscous liquid has adhered to the condensation surfaces 22a. Thus, the condensation/separation device 20 provided with such condensation surfaces 22a is extremely efficient in removing impurities containing mist-like tar, dust and the like.

If impurities that have condensed on the condensation surfaces 22a are maintained in a liquid state, even though they are in the form of a highly viscous liquid, once the amount of that liquid reaches a certain amount, the liquid eventually is caused to flow downward by gravity due to action of low viscosity liquid also present on the condensation surfaces 22a together with the highly viscous liquid. Once the limit of the amount of highly viscous liquid able to adhere to the condensation surfaces 22a has been exceeded, the liquid separates from the condensation surfaces 22a and drips downward in the vertical direction.

Since this type of condensation/separation device 20 is not provided with a filter or other filtration material, it can be designed to have low pressure loss. In addition, there is no occurrence of problems associated with conventional methods using filtration materials, such as the problem of being unsuitable for removal of mist containing a tar component or other impurities despite being suitable for removal of dust, the problem of the filtration material clogging making removal of dust difficult even though dust is initially able to be removed since mist adheres to the surface of the filtration material in a short period of time, or the problem of requiring considerable effort to remove mist adhered to the filtration material due to its high viscosity.

Moreover, in the present embodiment, in addition to not using a filtration material, the temperature of the condensation surfaces 22a is controlled to be 0° C. to 100° C. Consequently, treatment can be carried out without any particular problems even in the case of a large air flow rate of, for example, 500 Nm$^3$/hr, for which treatment was difficult with a conventional mist separator, while also resulting in superior energy efficiency.

In addition, the flow rate Y of gas introduced into the condensation treatment chamber 21 of the condensation/separation device 20 from the hot air circulation path 12 is not limited to 500 Nm$^3$/hr or more.

The highly viscous liquid of impurities containing dust like that formed on the condensation surfaces 22a of the condensation/separation device 20 of the present embodiment is not a Newtonian fluid and undergoes changes in composition over time. Consequently, it is extremely difficult to analyze and predict the behavior of highly viscous liquid adhered to the condensation surfaces 22a as it flows over and drips down from the condensation surfaces 22a due to gravity. In response thereto, the inventors of the present invention found that protecting the condensation surfaces 22a with a low viscosity liquid enables the highly viscous liquid adhered to the condensation surfaces 22a to effectively flow over and drip down from the condensation surfaces 22a by using the condensation/separation device 20 having the configuration described above and by making the surface temperature of the condensation surfaces 22a to be within the range of 0° C. to 100° C.

If the temperature of the condensation surfaces 22a is below 0° C., moisture contained in the hot air condenses and freezes on the condensation surfaces 22a, thereby inhibiting the condensation of impurities in the hot air and lowering condensation efficiency. If the temperature exceeds 100° C., the tar-like highly viscous liquid adhered to the condensation surfaces 22a is exposed to hot air on the condensation surfaces 22a causing it to undergo a crosslinking reaction and adhere to and accumulate on the condensation surfaces 22a. Namely, by controlling the surface temperature of the condensation surfaces 22a to be within the range of 0° C. to 100° C., a state is able to be maintained in which highly viscous liquid and low viscosity liquid are both present, thereby enabling impurities that have condensed on the condensation surfaces 22a to flow over and drip down in the vertical direction from the condensation surfaces 22a without accumulating thereon. As a result, the surfaces of the condensation surfaces 22a are continuously renewed and stable operation can be continued. The surface temperature of the condensation surfaces 22a is more preferably within the range of 0° C. to 80° C.

The surface temperature (inner surface temperature) of the condensate collection unit 23 of the condensation/separation device 20 is preferably within the range of 0° C. to 100° C., more preferably within the range of 0° C. to 80° C. and even more preferably within the range of 0° C. to 50° C. Collected highly viscous liquid can be maintained in a liquid state if the surface temperature of the condensate collection unit 23 is within these ranges, thereby making this preferable. Furthermore, differing from the condensation surfaces 22a, the surface temperature of the condensate collection unit 23 is not required to be within these temperature ranges, but rather can be suitably designed according to retention time and the type of discharge system. The aforementioned surface temperature can be controlled by a method consisting of providing a jacket or heater and the like around the periphery of the condensate collection unit 23.

In the condensation/separation device 20 of the present embodiment, the temperature of gas discharged from the gas outlet 21b is controlled to be higher than the surface temperature of the condensation surfaces 22a. As a result, even if treating at a large air flow rate of 500 Nm³/hr or more, for example, there is no excessive decrease in the temperature of the gas resulting in superior energy efficiency.

When simultaneously considering energy efficiency and impurity removal performance, the temperature of hot air at the hot air inlet 21a is preferably 100° C. to 300° C., more preferably 150° C. to 250° C. and even more preferably 190° C. to 230° C. If the aforementioned hot air temperature is equal to or higher than the lower limit value of the aforementioned ranges, impurities are inhibited from condensing in the vicinity of the hot air inlet 21a prior to reaching the condensation surfaces 22a, thereby enabling the impurities to be removed since the impurity efficiently condenses on the condensation surfaces 22a. If the aforementioned hot air temperature is equal to or lower than the upper limit value of the aforementioned ranges, the temperature of the hot air decreases sufficiently when the hot air reaches the condensation surfaces 22a, thereby enabling impurities to be removed since the impurity efficiently condenses on the condensation surfaces 22a.

The temperature of gas at the gas outlet 21b is preferably within the range of 100° C. to 150° C., more preferably within the range of 100° C. to 130° C., and even more preferably within the range of 100° C. to 120° C. If the temperature of gas discharged from the gas outlet 21b is equal to or higher than the lower limit value of the aforementioned ranges, there is no risk of impurities remaining in the gas solidifying and accumulating at a location other than the condensation surfaces 22a, such as in the vicinity of the gas outlet 21b. If the temperature of gas discharged from the gas outlet 21b is equal to or lower than the upper limit value of the aforementioned ranges, impurities in the hot air are adequately condensed and removed, thereby allowing the obtaining of an adequate effect.

The temperature of gas at the hot air inlet 21a and gas outlet 21b can be controlled by a method consisting of providing a jacket or heater and the like around the periphery of the hot air inlet 21a and gas outlet 21b.

The flow rate Y (Nm³/hr) of gas introduced into the condensation treatment chamber 21 from the hot air circulation path 12 and the surface area A (m²) of the condensation surfaces 22a preferably satisfy the relational expression (1) indicated below.

Furthermore, the surface area A of the condensation surfaces 22a refers to the total surface area of the condensation surfaces 22a, and in the case of the example indicated in the drawings, is the total surface area of all of the straight tubes 25, and in the case of using a single tube-type, U-shaped heat exchanger, for example, is the total surface area of all U-shaped single tubes through which coolant flows.

$$10 \le Y/A \le 1000 \tag{1}$$

If Y/A is 10 or more, the surface area of the condensation surfaces 22a is not excessively large relative to the treated amount of hot air and increases in equipment costs can be curbed. If Y/A is 1000 or less, the surface area of the condensation surfaces 22a is sufficiently large relative to the treated amount of hot air, thereby enabling the highly viscous liquid to drip down smoothly without concern over adhesion or accumulation thereof.

Furthermore, the flow rate Y (Nm³/hr) of gas introduced into the condensation treatment chamber 21 from the hot air circulation path 12 is preferably 3000 Nm³/hr to 500000 Nm³/hr.

Examples of methods used to control the gas flow rate Y include a method consisting of providing a flow regulating valve (not shown) on the upstream side of the condensation/separation device 20, or in other words, in the branched path 12c, and controlling the gas flow rate Y by operating that valve, and a method consisting of providing a damper (not shown) and a blower fan (not shown) on the downstream side of the condensation/separation device 20, or in other words, in the return path 24, and controlling the gas flow rate Y by opening and closing the aforementioned damper and adjusting the amount of air blown by the blower fan.

The amount of fresh air X (outside air) per unit time (Nm³/hr) supplied to the heat treatment furnace device 10, the gas flow rate Y (Nm³/hr) and the supply rate Z (kg/hr) of the PAN-based precursor fiber bundle F preferably satisfy the relational expression (2) indicated below.

$$1 \le (X+Y)/Z \le 500 \tag{2}$$

If (X+Y)/Z is 1 or more, the amount of fresh air X and the gas flow rate Y are large relative to the amount of the PAN-based precursor fiber bundle F supplied to the heat treatment chamber 11, thereby making it possible to adequately reduce impurities.

On the other hand, if (X+Y)/Z is 500 or less, the amount of fresh air X and gas flow rate Y are low relative to the amount of the PAN-based precursor fiber bundle F supplied to the heat treatment chamber 11, thereby making it possible to curtail heating costs of hot air and attain superior economic efficiency.

Furthermore, fresh air may be introduced from any location provided it is supplied into the system of the heat treatment furnace device 10. For example, an air intake port may be provided in the hot air circulation path 12 as previously described and fresh air may be supplied therefrom, or an air intake port may be provided in the heat treatment chamber 11 and fresh air may be supplied therefrom. In addition, an air intake port may also be provided in the branched path 12*c* and fresh air may be supplied therefrom.

The inner wall temperature (inner surface temperature) of the condensation treatment chamber 21 is preferably about 70° C. to 150° C. higher than the surface temperatures of the condensation surfaces 22*a* and condensate collection unit 23. The inner walls of the condensation treatment chamber 21 refer to the inner surfaces of the condensation treatment chamber 21 of the condensation/separation device 20 excluding the surfaces of the condensation surfaces 22*a* and condensate collection unit 23, and come in contact with hot air supplied to the condensation/separation device 20. If the inner wall temperature of the condensation treatment chamber 21 is 70° C. to 150° C. higher than the surface temperatures of the condensation surfaces 22*a* and condensate collection unit 23, impurities in the hot air can be made to efficiently condense on the condensation surfaces 22*a*. If a portion of the inner walls of the condensation treatment chamber 21 is at a lower temperature than the surfaces temperatures of the condensation surfaces 22*a* and condensate collection unit 23, impurities condense at that portion resulting in a risk of impurities adhering and accumulating at that location.

The inner wall temperature of the condensation treatment chamber 21 can be controlled by a method consisting of providing a jacket or heater and the like around the periphery of the condensation treatment chamber 21.

A plurality of the heat treatment furnace device 10 as explained above may be used in a carbon fiber production process. More specifically, a plurality of the heat treatment furnace device 10 having the previously described configuration may be arranged in series, and the PAN-based precursor fiber bundle F may be sequentially introduced into the heat treatment chamber 11 of each heat treatment furnace device 10.

In addition, a majority of the impurities are generated during initial heat treatment (flame-proofing treatment). Consequently, in the case of arranging a plurality of heat treatment furnaces in series, the aforementioned heat treatment furnace device 10 connected to the condensation/separation device 20 is preferably applied to at least the initial heat treatment furnace (heat treatment furnace located in the first stage). As a result, impurities resulting from PAN-based precursor fiber bundles can be efficiently removed and the overall amount of impurities generated during flame-proofing treatment can be reduced. According to such an embodiment, each heat treatment furnace can be operated continuously over a long period of time also in the case of using a plurality of heat treatment furnaces.

Furthermore, although the return path 24 is connected to the gas outlet 21*b* and gas is returned to the hot air circulation path 12 through the return path 24 following separation of condensate in the previously explained examples, the gas is not limited to being returned to the hot air circulation path 12.

For example, instead of returning the gas to the hot air circulation path 12, it may be supplied to a heat treatment furnace exhaust gas treatment device (not shown). In this configuration, the condensation/separation device 20 functions as a pretreatment device of the heat treatment furnace exhaust gas treatment device.

In general, exhaust gas from a heat treatment furnace such as a flame-proofing furnace used to produce carbon fibers contains HCN. Consequently, combustion treatment is carried out to detoxify the aforementioned HCN. There are no particular limitations on the combustion treatment device, and a direct combustion exhaust gas treatment device, thermal storage-type exhaust gas treatment device or catalytic combustion treatment device are used typically. Among these, a thermal storage-type exhaust gas treatment device is attracting considerable attention because of its high efficiency. However, one of the problems encountered when maintaining this high level of efficiency is that, in the case exhaust gas from a heat treatment furnace contains a tar component and the like containing silicone, silica particles crystallize on the surface of the thermal storage medium and block the openings resulting in an increase in pressure loss that prevents stable operation. In response thereto, if the aforementioned condensation/separation device 20 is used as a pretreatment device and gas is supplied to the combustion treatment device following separation of condensate, the tar component containing silicone can be stably discharged outside the system while operating the device, and as a result thereof, an efficient thermal storage-type exhaust gas treatment device can be operated stably.

(Method of Producing Carbon Fiber Bundles)

Next, an explanation is provided of the method for producing carbon fiber bundles of the present invention.

The method for producing carbon fiber bundles of the present invention has a heat treatment step, in which precursor fiber bundles of carbon fibers are subjected to heat treatment by the heat treatment furnace device 10 to obtain flame-resistant fiber bundles or infusible fiber bundles, and a carbonization step, in which the resulting flame-resistant fiber bundles or infusible fiber bundles are subjected to carbonization treatment to obtain carbon fiber bundles.

The aforementioned heat treatment furnace device 10 is used in the heat treatment step.

Namely, a precursor fiber bundle such as the PAN-based precursor fiber bundle F is continuously introduced into the heat treatment chamber 11 and treated with hot air at 200° C. to 300° C.

On the other hand, hot air discharged from the heat treatment chamber 11 is returned to the heat treatment chamber through the hot air circulation path 12, and at that time, at least a portion of the hot air flowing through the hot air circulation path 12 is introduced into the condensation/separation device 20 where it is separated into a condensate and gas.

A condensation/separation device having a condensation treatment chamber 21, into which at least a portion of the hot air is introduced, and a condensation unit 22, which is provided in the condensation treatment chamber 21 and has condensation surfaces 22*a* on which impurities are formed and drip down from, is used for the condensation/separation device 20. In addition, at this time, the surface temperature of the condensation surfaces 22*a* is controlled to be 0° C. to 100° C., and the temperature of the aforementioned gas discharged from the gas outlet 21*b* formed in the condensation treatment chamber 21 is controlled to be higher than the surface temperature of the condensation surfaces 22*a*.

(Precursor Fibers)

Examples of the precursor fiber bundles include PAN-based precursor fiber bundles having PAN-based fibers as the raw material thereof as well as pitch-based precursor fiber bundles. Any known precursor fiber bundles can be used for these precursor fiber bundles. In the case of PAN-based precursor fiber bundles, for example, PAN-based precursor fiber bundles obtained by dissolving a PAN-based polymer, having a known composition and obtained according to a known polymerization method, in an organic solvent or inorganic solvent and spinning according to a known method can be used.

(Oil Agent Treatment)

PAN-based precursor fiber bundles are normally subjected to oil agent treatment, and are further subjected to stretching treatment as necessary. An oil agent containing a silicone-based compound (silicone-based oil agent) is preferably used in the oil agent treatment. Silicone-based compounds are able to impart superior cohesiveness, flexibility, smoothness, antistatic properties and process stability to PAN-based precursor fiber bundles, allow superior processability in flame-proofing treatment and carbonization treatment, and exhibit remarkable effects in preventing fusion during carbonization treatment in particular.

An amino-modified silicone is preferably used for the silicone-based compound contained in the silicone-based oil agent. Among amino-modified silicones, a side-chain primary amino-modified silicone, a side-chain primary/secondary amino-modified silicone or a dual-end modified silicone is used particularly preferably.

Application of the oil agent to the PAN-based precursor fiber bundles (oil agent treatment) can be carried out according to any known method.

(Heat Treatment Step)

In the case of PAN-based precursor fiber bundles, after having been subjected to oil agent treatment and adequately dried, the PAN-based precursor fiber bundles are subjected to flame-proofing treatment in the heat treatment furnace device 10 of the example shown in the drawings (heat treatment step). Flame-proofing conditions consist of treating in hot air at 200° C. to 300° C. under tightened or stretched conditions preferably until the density of the flame-resistant fibers following flame-proofing treatment becomes 1.30 g/cm$^3$ to 1.40 g/cm$^3$.

Furthermore, in the case of producing a refractory product such as flame-retardant woven fabric from flame-resistant fiber bundles obtained by firing processing, the density of the aforementioned flame-resistant fiber bundles may exceed 1.40 g/cm$^3$. However, if this density exceeds 1.50 g/cm$^3$, a longer amount of time is required for firing process to obtain the flame-resistant fiber bundles, thereby making this undesirable in economic terms.

The hot air that fills the heat treatment chamber 11 is a gas containing an oxidizing substance such as oxygen or nitrogen dioxide, and although there are no particular limitations thereon provided it is able to maintain an oxidizing atmosphere, from the viewpoint of industrial production, atmospheric air is used preferably in consideration of economic and safety factors. In addition, oxygen concentration in the hot air may be changed for the purpose of adjusting oxidation capacity.

Furthermore, a heat treatment step for obtaining infusible fiber bundles by subjecting pitch-based precursor fiber bundles to heat treatment (infusibilization treatment) may also be carried out in hot air at 200° C. to 300° C. with the heat treatment furnace device 10 of the example shown in the drawings.

(Carbonization Step)

Pre-carbonization treatment and carbonization treatment are preferably carried out sequentially in the carbonization step.

In the case of PAN-based precursor fiber bundles, following the aforementioned heat treatment step, flame-resistant fiber bundles are introduced into a carbonization furnace and subjected to pre-carbonization treatment. The maximum temperature during pre-carbonization treatment is preferably 550° C. to 800° C. Pre-carbonization treatment is preferably carried out at a rate of temperature increase of 500° C./min or less and more preferably 300° C./min or less over a temperature range of 300° C. to 500° C. in order to improve mechanical properties of the resulting carbon fibers.

Any known inert atmosphere containing nitrogen, argon or helium and the like can be employed for the inert atmosphere that fills the pre-carbonization furnace, and nitrogen is preferable from the viewpoint of economy.

The pre-carbonized fiber bundles obtained as a result of pre-carbonization treatment are introduced into a carbonization furnace and subjected to carbonization treatment. The pre-carbonized fiber bundles are preferably subjected to carbonization treatment at a rate of temperature increase of 500° C./min or less over a temperature range of 1000° C. to 2000° C. in an inert atmosphere within a temperature range of 1200° C. to 3000° C. in order to improve the mechanical properties of the resulting carbon fibers.

Any known inert atmosphere containing nitrogen, argon or helium and the like can be employed for the inert atmosphere that fills the carbonization furnace, and nitrogen is preferable from the viewpoint of economy.

Carbon fiber bundles obtained in this manner maybe coated with a sizing agent in order to improve handling ease and affinity with matrix resin as necessary. There are no particular limitations on the type of sizing agent provided it allows the obtaining of the desired properties, and examples thereof include sizing agents mainly composed of epoxy resin, polyether resin, epoxy-modified polyurethane resin and polyester resin. Any known method can be used to apply the sizing agent.

In the case of using carbon fiber bundles in fiber-reinforced composite materials, a sizing agent may be applied after having subjected the carbon fiber bundles to electrolytic oxidation treatment or oxidation treatment for the purpose of improving affinity and adhesiveness with the matrix resin.

Furthermore, the carbonization step regarding pitch-based precursor fiber bundles can be carried out using a known method.

EXAMPLES

The following provides a detailed explanation of the present invention by indicating examples thereof.

Example 1

(Production of Precursor Fiber Bundle F)

Acrylonitrile-based polymer was dissolved in dimethylacetamide to a concentration of 21% by weight to prepare a spinning dope. This spinning dope was then subjected to wet spinning using a nozzle having 24,000 holes into an aqueous dimethylacetamide solution having a concentration of 70% by weight and temperature of 35° C. to obtain coagulated yarn.

Next, after stretching the aforementioned coagulated yarn by a factor of 1.5 in air, the coagulated yarn was further stretched by a factor of 3 in boiling water while simultaneously carrying out cleaning and solvent removal to obtain swollen yarn.

Subsequently, the aforementioned swollen yarn was immersed in an oil agent treatment tank containing an aqueous dispersion of an oil agent, and after the oil agent had adhered to the swollen yarn, the coated swollen yarn was dried with heated rollers at 140° C. and then stretched by a factor of 3 in the presence of high-pressure steam to obtain a precursor fiber bundle F composed of PAN-based fiber having single fiber fineness of 1.0 dtex and density of 1.18 g/cm$^3$. The content of the aforementioned oil agent based on the aforementioned precursor fiber bundle F was 1.0% by weight.

(Preparation of Aqueous Dispersion of Oil Agent)

The aforementioned aqueous dispersion of the oil agent was prepared in the manner as follows:

Dual-end amino-modified silicone (viscosity at 25° C.: 500 cSt, amino equivalent: 5700 g/mol) was used for the main component of the oil agent and a nonionic emulsifier (polyoxyethylene stearyl ether) was used for the emulsifier. Deionized water was added to a mixture thereof followed by emulsifying and further subjecting to secondary emulsification to obtain an emulsified particle diameter of 0.3 μm to prepare an aqueous dispersion of the oil agent.

(Flame-Proofing Step)

The flame-proofing step was carried out using a heat treatment furnace device having the same configuration as that shown in FIG. 1 with the exception of being equipped with a condensation/separation device provided with a condensation unit composed of a vertical heat exchanger having multi U-shaped tubes.

First, the precursor fiber bundle F was continuously supplied to the heat treatment chamber and subjected to flame-proofing treatment to obtain a flame-resistant fiber bundle having a density of 1.35 g/cm$^3$.

Furthermore, perforated panels having a hole diameter of 4 mm and aperture ratio of 30% were installed at the hot air blowout port and hot air intake port so that the hot air (air) uniformly contacts the precursor fiber bundle.

The conditions of the flame-proofing step were as indicated below.

Temperature of heat treatment chamber: 230° C.

Air flow rate at hot air blowout port of hot air circulation path: 3 m/s

Supply rate of precursor fiber bundle F to heat treatment chamber: 400 kg/hr

Retention time of precursor fiber bundle F in heat treatment chamber: 15 min

Gas flow rate Y: 10,000 Nm$^3$/hr

Temperature of hot air at hot air inlet of condensation treatment chamber of condensation/separation device: 220° C.

Temperature of gas at gas outlet of condensation treatment chamber of condensation/separation device: 120° C.

Surface temperature of condensation surfaces: 50° C.

Surface temperature of condensate collection unit: 70° C.

Surface temperature (inner wall temperature) of inner walls of condensation treatment chamber: 100° C.

Surface area A of condensation surfaces: 50 m$^2$

Y/A=200

Arithmetic average surface roughness Ra (JIS B 0601-2001) of condensation surfaces: 40 nm Angle between axial direction of straight portions of U-shaped portions of multi tube-type heat exchanger and horizontal direction: 90° (positioned as connecting portion of U-shape facing downward)

X (supply of fresh air (outside air) to heat treatment chamber): 20000 Nm$^3$/hr (X+Y)/Z=75

The flame-proofing step was continued under the aforementioned conditions, and both the heat treatment chamber and condensation/separation device were found to demonstrate continuous stable operation for 30 days and more.

In addition, the "number of days until 10% decrease in air flow rate" as determined according to the method described below was determined during the flame-proofing step, and no decreases in flow rate were observed even after 30 days had elapsed. The results are shown in Table 1.

(Carbonization Step)

The resulting flame-resistant fiber bundle was further subjected to pre-carbonization treatment for 1.4 minutes at a temperature of 700° C. and with an elongation rate of 3.0% in a nitrogen atmosphere followed by subjecting to carbonization treatment for 1.0 minutes at a temperature of 1300° C. and with an elongation rate of −4.0% in a nitrogen atmosphere to obtain a carbon fiber bundle.

The "number of fuzz balls on carbon fiber bundle" was measured according to the method described below, and the number of fuzz balls observed per 10 m of length of the carbon fiber bundle was found to be within the range of 0 to 5. The results are shown in Table 1.

[Analysis of Impurities in Hot Air]

To analyze impurities contained in the hot air, a portion of the hot air flowing through the branched path 12c was introduced into a water-cooled trap (20° C.) without lowering the temperature.

The majority of impurities captured in the water-cooled trap was a low viscosity liquid. A brown tar-like highly viscous liquid had undergone phase separation and settled in the bottom portion of the low viscosity liquid. The ratio of the weight of the pale yellow low viscosity liquid to the weight of the brown tar-like highly viscous liquid was about 5:1.

As a result of chemical analysis, the main components of the pale yellow low viscosity liquid were determined to consist of dual-end amino-modified silicone and nonionic emulsifier (polyoxyethylene stearyl ether), while the main components of the brown tar-like highly viscous liquid were determined to consist of compounds resulting from oxidation and polymerization of the amino-modified silicone and fine silicon oxide particles.

[Number of Days until 10% Decrease in Air Flow Rate]

The flow rate of hot air was measured by maintaining the frequency of a fan provided at an intermediate location in the hot air circulation path at a constant frequency, and installing a Pitot tube at the hot air blowout port of the hot air circulation path.

The number of days until the air flow rate decreased by 10% relative to the initial air flow rate (number of days until 10% decrease in air flow rate) was observed and evaluated according to the four criteria indicated below.

In the case impurities in the hot air are not adequately removed in the condensation/separation device, dust and tar accumulate in the hot air circulation path and the hot air discharge port becomes blocked, thereby reducing the number of days until the air flow rate decreases by 10%.

A: No decrease in air flow rate observed even after 30 days

B: 10% decrease in air flow rate observed after 8 to 29 days

C: 10% decrease in air flow rate observed after 2 to 7 days

D: 10% decrease in air flow rate observed after 1 day

[Number of Fuzz Balls on Carbon Fiber Bundle]

The resulting carbon fiber bundle was illuminated with an LED light followed by measuring the number of fuzz balls observed per 10 m of length of the carbon fiber bundle and evaluating according to the four criteria indicated below.

A: 0 to 5 fuzz balls
B: 6 to 15 fuzz balls
C: 16 to 100 fuzz balls
D: 101 or more fuzz balls

[Adhesion of Tar Component and Dust to Condensation Surfaces]

After operating for 10 days, the condensation/separation unit was decoupled from the hot air circulation path and disassembled followed by observing for the presence or absence of adhesion of condensate to the condensation surfaces and evaluating that adhesion according to the four criteria indicated below. The condensation surfaces were judged to be protected with low viscosity liquid in the case the degree of adhesion was evaluated as "A" according to the evaluation criteria.

A: Although low viscosity liquid and highly viscous tar components and dust are deposited to the condensation surfaces, the highly viscous tar components and dust can be easily wiped off with a dry cloth.

B: Highly viscous tar components and dust are deposited to the condensation surfaces and a portion thereof remain on the condensation surfaces even if attempted to be wiped off with a dry cloth (irrespective of presence or absence of low viscosity liquid).

C: Highly viscous tar components and dust are adhered toed the condensation surfaces and cannot be removed even if attempted to be wiped off with a dry cloth (irrespective of presence or absence of low viscosity liquid).

D: Ice mixed in with highly viscous tar components and dust is deposited to the condensation surfaces.

Example 2

A carbon fiber bundle was produced under the same conditions as Example 1 with the exception of changing the gas flow rate Y from the hot air circulation path to the condensation/separation device to 6100 Nm$^3$/hr. The evaluation results are shown in Table 1.

Comparative Example 1

A carbon fiber bundle was produced under the same conditions as Example 1 with the exception of changing the surface temperature of the condensation surfaces to 130° C. As a result, a decrease in air flow rate was observed 1 day after starting operation. When the condensation surfaces were observed, condensate was observed to have adhered to the surfaces thereof. The number of fuzz balls on the carbon fiber bundle was measured and evaluated until the device was stopped. The evaluation results are shown in Table 1.

Comparative Example 2

A carbon fiber bundle was produced under the same conditions as Example 1 with the exception of changing the surface temperature of the condensation surfaces to 110° C., making the surface area of the condensation surfaces to be 135 m$^2$ by adding U-shaped tubes, and making the temperature of gas discharged from the gas outlet of the condensation/separation device to be 120° C. As a result, a decrease in air flow rate was observed 1 day after starting operation. When the condensation surfaces were observed, condensate was observed to have adhered to the surfaces thereof. The number of fuzz balls on the carbon fiber bundle was measured and evaluated until the device was stopped. The evaluation results are shown in Table 1.

Example 3

A carbon fiber bundle was produced under the same conditions as Example 1 with the exception of changing the surface temperature of the condensation surfaces to 90° C., making the surface area of the condensation surfaces to be 83 m$^2$ by adding U-shaped tubes, and making the temperature of gas discharged from the gas outlet of the condensation/separation device to be 120° C. The evaluation results are shown in Table 1.

Example 4

A carbon fiber bundle was produced under the same conditions as Example 1 with the exception of changing the surface temperature of the condensation surfaces to 10° C., making the surface area acting as condensation surfaces to be 37 m$^2$ by blocking a portion of the U-shaped tubes, and making the temperature of gas discharged from the gas outlet of the condensation/separation device to be 120° C. The evaluation results are shown in Table 1.

Comparative Example 3

A carbon fiber bundle was produced under the same conditions as Example 1 with the exception of changing the surface temperature of the condensation surfaces to 10° C., making the surface area acting as condensation surfaces to be 32 m$^2$ by blocking a portion of the U-shaped tubes, and making the temperature of gas discharged from the gas outlet of the condensation/separation device to be 120° C. As a result, a decrease in air flow rate was observed 1 day after starting operation. When the condensation surfaces were observed, moisture was observed to have frozen on the surfaces thereof. The number of fuzz balls on the carbon fiber bundle was measured and evaluated until the device was stopped. The evaluation results are shown in Table 1.

Example 5

A carbon fiber bundle was produced under the same conditions as Example 1 with the exception of making the surface area acting as condensation surfaces to be 25 m$^2$ by blocking a portion of the U-shaped tubes and changing the temperature of gas discharged from the gas outlet of the condensation/separation device to 160° C. The evaluation results are shown in Table 1.

Example 6

A carbon fiber bundle was produced under the same conditions as Example 1 with the exception of making the surface area acting as condensation surfaces to be 30 m$^2$ by blocking a portion of the U-shaped tubes and changing the temperature of gas discharged from the gas outlet of the condensation/separation device to 150° C. The results are shown in Table 1.

Example 7

A carbon fiber bundle was produced under the same conditions as Example 1 with the exception of making the surface area of the condensation surfaces to be 82 m² by adding U-shaped tubes and changing the temperature of gas discharged from the gas outlet of the condensation/separation device to 90° C. As a result, a decrease in air flow rate was observed 7 days after starting operation. When the inside of the condensation treatment chamber was observed, a large amount of moisture was observed to have been captured in the condensate collection unit. In addition, an abnormal noise was heard as a result of the fan being off center. The results are shown in Table 1.

Comparative Example 4

Figure 4:
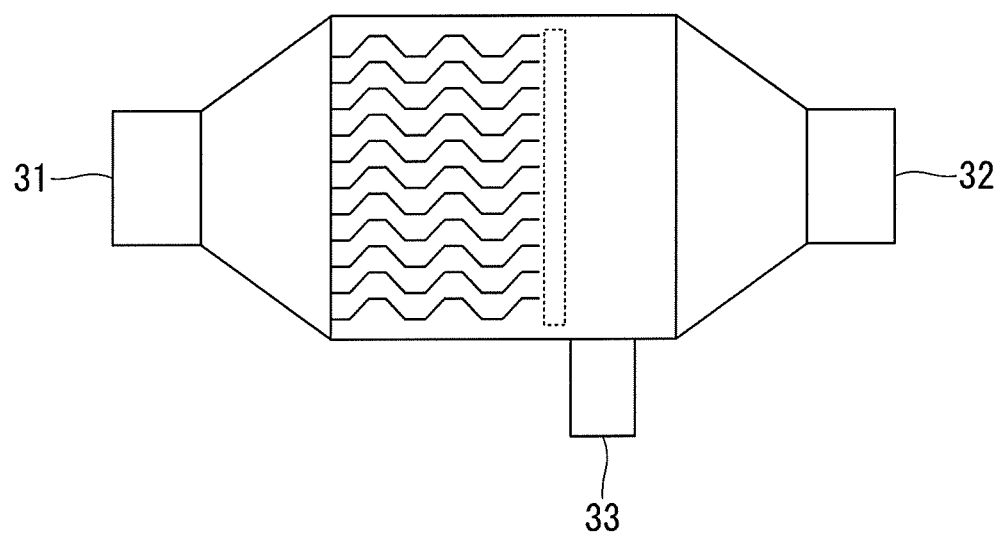
FIG. 4 is a schematic cross-sectional drawing showing an example of the configuration of a condensation/separation device provided with an ordinary wave-plate mist separator in an embodiment of Comparative Example 4.

A carbon fiber bundle was produced under the same conditions as Example 1 with the exception of using an ordinary wave plate mist separator like that shown in FIG. 4 instead of the condensation/separation device used in Example 1. The results are shown in Table 1.

Since the temperature of the mist separator is not controlled, the temperature of the wave plate portion thereof is roughly equal to the temperature of the hot air introduced thereto. Consequently, impurities are unable to be adequately removed, the number of days until a 10% decrease in air flow rate was smaller, and the quality of the resulting carbon fiber bundle was inferior to that of Example 1.

Furthermore, in FIG. 4, reference symbol 31 indicates a hot air inlet, reference symbol 32 indicates a gas outlet, and reference symbol 33 indicates a drain discharge unit.

Example 8

A carbon fiber bundle was produced under the same conditions as Example 1 with the exception of decreasing the surface area A (m²) of the condensation surfaces by blocking a portion of the U-shaped tubes and changing the ratio of the air flow rate Y (Nm³/hr) to A (Y/A) as shown in Table 1. The results are shown in Table 1.

TABLE 1

|  |  | Ex. 1 | Ex. 2 | Comp. Ex. 1 | Comp. Ex. 2 | Ex. 3 | Ex. 4 | Comp. Ex. 3 | Ex. 5 | Ex. 6 | Ex. 7 | Comp. Ex. 4 | Ex. 8 |
|---|---|---|---|---|---|---|---|---|---|---|---|---|---|
| Surface temp. of condensation surfaces | ° C. | 50 | 50 | 130 | 110 | 90 | 10 | −10 | 50 | 50 | 50 | — | 50 |
| Gas flow rate: Y | Nm³/hr | 10,000 | 6,100 | 10,000 | 10,000 | 10,000 | 10,000 | 10,000 | 10,000 | 10,000 | 10,000 | 10,000 | 10,000 |
| Condensation surface area A | m² | 50 | 50 | 50 | 135 | 83 | 37 | 32 | 25 | 30 | 82 | 50 | 10 |
| Y/A | Nm/hr | 200 | 122 | 200 | 74 | 120 | 270 | 313 | 408 | 333 | 122 | 200 | 1,000 |
| Temp. of hot air supplied to hot air inlet | ° C. | 220 | 220 | 220 | 220 | 220 | 220 | 220 | 220 | 220 | 220 | 220 | 220 |
| Temp. of gas discharged from gas outlet | ° C. | 120 | 90 | 167 | 120 | 120 | 120 | 120 | 160 | 150 | 90 | — | 192 |
| Surface temp. of condensate collection unit | ° C. | 70 | 70 | 70 | 70 | 70 | 70 | 70 | 70 | 70 | 70 | — | 70 |
| Inner wall temp. of condensation treatment chamber | ° C. | 100 | 100 | 100 | 100 | 100 | 100 | 100 | 100 | 100 | 100 | — | 100 |
| Amount of fresh air supplied to heat treatment furnace: X | Nm³/hr | 20,000 | 20,000 | 20,000 | 20,000 | 20,000 | 20,000 | 20,000 | 20,000 | 20,000 | 20,000 | 20,000 | 20,000 |
| Supply rate of PAN-based precursor fiber bundle: Z | kg/hr | 400 | 400 | 400 | 400 | 400 | 400 | 400 | 400 | 400 | 400 | 400 | 400 |
| (X + Y)/Z | Nm³/kg | 75 | 65 | 75 | 75 | 75 | 75 | 75 | 75 | 75 | 75 | 75 | 75 |
| Arithmetic average surface roughness Ra of condensation surfaces | nm | 40 | 40 | 40 | 40 | 40 | 40 | 40 | 40 | 40 | 40 | — | 40 |
| No. of days until 10% decrease in air flow rate | (−) | A | A | D | D | B | A | D | C | A | C | D | C |
| No. of fuzz balls on carbon fiber bundle | (−) | A | B | C | B | A | A | B | B | B | C | C | B |
| Adhesion of tar and dust to condensation surfaces | (−) | A | A | C | B | A | A | D | A | A | A | B | A |

INDUSTRIAL APPLICABILITY

According to the heat treatment furnace device and method for producing carbon fibers of the present invention, highly viscous impurities containing a mist-like tar component, dust and the like, which are contained in hot air discharged from a heat treatment furnace that heats precursor fiber bundles of carbon fibers, can be stably separated and removed. Consequently, in addition to being able to reduce problems attributable to impurities and allow continuous operation of the heat treatment furnace device over a long period of time, problems such as breakage or fuzz affecting carbon fiber bundles caused by these impurities can be inhibited, thereby enabling the production of high-quality carbon fibers.

BRIEF DESCRIPTION OF THE REFERENCE SYMBOLS

F: PAN-based precursor fiber bundle
10: Heat treatment furnace device
11: Heat treatment chamber
12: Hot air circulation path
20: Condensation/separation device
21: Condensation treatment chamber
21a: Hot air inlet
21b: Gas outlet
22: Condensation unit
22a: Condensation surface
23: Condensate collection unit
24: Return path
28: Separating liquid supply port
29: Separating liquid reservoir

The invention claimed is:

1. A method for producing oxidized fiber bundles, the method comprising:
    separating a condensate from at least a portion of air discharged from a heat treatment chamber and
    circulating the air by returning the air to the heat treatment chamber, while precursor fiber bundles of carbon fibers are continuously supplied to a heat treatment chamber, heat-treated at 200° C. to 300° C. with air comprising an oxidizing substance, and extracted from the heat treatment chamber to obtain the oxidized fiber bundles;
    wherein the condensate is separated by trapping it on condensation surfaces that are protected with a liquid that is a mixture of surfactant components and silicon compounds contained in an oil agent applied to the precursor fiber bundle, or is a separating liquid that is actively supplied to the condensation surfaces.

2. A method for producing oxidized fiber bundles, the method comprising:
    separating a condensate from at least a portion of air discharged from a heat treatment chamber, and
    circulating the air by returning the air to the heat treatment chamber, while precursor fiber bundles of carbon fibers are continuously supplied to a heat treatment chamber, heat-treated at 200° C. to 300° C. with air comprising an oxidizing substance, and extracted from the heat treatment chamber to obtain the oxidized fiber bundles;
    wherein the condensate is formed on and allowed to drip down from condensation surfaces that are protected with a liquid that is a mixture of surfactant components and silicon compounds contained in an oil agent applied to the precursor fiber bundle, or is a separating liquid that is actively supplied to the condensation surfaces, and
    a temperature of air immediately after separation of the condensate is higher than a surface temperature of the condensation surfaces.

3. The method according to claim 2, wherein surfaces of the condensation surfaces are protected with a liquid condensed from the air.

4. The method according to claim 1, which satisfies expression (1)

$$10 \leq Y/A \leq 1000 \tag{1}$$

wherein Y refers to a gas flow rate of at least a portion of the air discharged from the heat treatment chamber from which the condensate is separated, and
   A refers to a surface area of the condensation surfaces.

5. The method according to claim 1,
    wherein a temperature of air after separation of the condensate is 100° C. to 150° C.

6. The method according to claim 1, wherein a temperature of the air before separation of the condensate is 100° C. to 300° C.

* * * * *